United States Patent [19]

Galvagni

[11] 4,318,144
[45] * Mar. 2, 1982

[54] FLEXIBLE MAGNETIC DISK RECORDING APPARATUS

[75] Inventor: Alighiero Galvagni, Ivrea, Italy

[73] Assignee: Ing. C. Olivetti & C., S.p.A., Ivrea, Italy

[ * ] Notice: The portion of the term of this patent subsequent to Sep. 23, 1997, has been disclaimed.

[21] Appl. No.: 144,867

[22] Filed: Apr. 29, 1980

Related U.S. Application Data

[63] Continuation of Ser. No. 881,656, Feb. 27, 1978, abandoned.

[30] Foreign Application Priority Data

Mar. 4, 1977 [IT] Italy ............................... 67478 A/77

[51] Int. Cl.³ ...................... G11B 17/00; G11B 19/28; G11B 15/46; G11B 5/82
[52] U.S. Cl. ........................................ 360/99; 360/73; 360/86; 360/133
[58] Field of Search ................................... 360/97–99, 360/86, 133, 135, 73, 71, 69, 107

[56] References Cited

U.S. PATENT DOCUMENTS

| | | | |
|---|---|---|---|
| 2,562,665 | 8/1951 | Grimm | 360/86 |
| 2,567,092 | 9/1951 | Williams | 360/86 |
| 2,901,737 | 8/1959 | Stovall, Jr. | 360/73 |
| 3,475,741 | 10/1969 | Toney | 360/133 |
| 3,509,274 | 4/1970 | Kilhara | 360/86 |
| 3,638,954 | 2/1972 | Kato | 360/107 |
| 3,646,259 | 2/1972 | Schuller | 360/73 |
| 3,947,625 | 3/1976 | Greve | 360/73 |
| 4,123,779 | 10/1978 | Goldschmidt | 360/73 |
| 4,149,207 | 4/1979 | Porter et al. | 360/99 |

FOREIGN PATENT DOCUMENTS 2346867  3/1975  Fed. Rep. of Germany ........ 360/86

Primary Examiner—Alfred H. Eddleman
Attorney, Agent, or Firm—Schuyler, Banner, Birch, McKie & Beckett

[57] ABSTRACT

An apparatus for recording binary information on a flexible magnetic disk of small dimension, comprises a rotatable hub connected to a plate on a first surface of which is formed a spiral guide. The hub has a cylindrical portion engageable accurately with a corresponding central hole of the disk and it is provided with a radial driving dog engageable on the fly, and with play, with a corresponding radial notch opening out of the central hole. A recording head is mounted at the end of an arm which has an element cooperating with the spiral guide of the plate for being moved, radially with respect to the disk, in synchronism with the rotation of the plate and of the same disk.

7 Claims, 9 Drawing Figures

FLEXIBLE MAGNETIC DISK RECORDING APPARATUS

This is a continuation, of application Ser. No. 881,656, filed Feb. 27, 1978 now abandoned.

BACKGROUND OF THE INVENTION

1. Field of the Invention

The present invention relates to an apparatus for writing and/or reading binary information on a flexible magnetic disc, comprising a rotatable hub adapted to engage with the disc and a writing and/or reading head mounted at the end of an arm which so moves in synchronism with the hub so as to move the head generally radially with respect to the hub. The arm may be pivoted so that the head follows an arcuate path which is nevertheless generally radial with respect to the hub. The apparatus is particularly suitable for use with the smaller size flexible discs now employed for some purposes and having a diameter less than 100 mm.

2. Description of the Prior Art

An apparatus of the type referred to is known wherein the hub is provided with a radial element engaging with the disc to rotate with it and wherein the disc is set in rotation by a pair of opposed rollers, which nip the disc and one of which is connected to an electric motor; in this way, therefore, it is the hub that is driven by the disc. In this apparatus, a worm is formed on the hub and engages with a worm wheel connected in turn to a screw which, by engaging with a lead nut, controls the radial movement of the writing head in synchronism with the rotation of the disc and the hub.

This apparatus, however, has the disadvantage that the magnetic disc is directly coupled to the rollers and is therefore subject to considerable wear in the part in contact with them, moreover, the synchronization between the head and the disc suffers from the effects of the inevitable backlash in the worm and worm wheel and the control screw and lead nut.

SUMMARY OF THE INVENTION

The principal object of the invention is to provide an apparatus for writing and/or reading data on a flexible magnetic disc wherein synchronization between the disc and the head is always ensured, using solutions which are simple and not costly.

According to the present invention, there is provided apparatus for writing and/or reading binary information on a flexible magnetic disc, comprising a rotatable hub adapted to engage with the disc and a writing and/or reading head mounted at the end of an arm for movement of the head generally radially with respect to the hub, wherein the hub is connected to a plate on a first surface of which there is formed a spiral guide adapted to co-operate with the movable arm to synchronize the movement of the head with the rotation of the disc.

A second object of the invention is to provide an apparatus wherein the angular speed of the disc increases linearly during the radial movement of the head from the periphery towards the centre of the disc, so that the relative speed between the head and the disc is substantially constant. In this way, the packing of binary information also becomes substantially uniform along the entire recording track.

In accordance with this second object, there is provided apparatus for writing and/or reading binary information along a spiral path on a flexible magnetic disc, comprising a direct-current electric motor for rotating the disc, a writing and/or reading head moving in operation, radially with respect to the disc in synchronism with the rotation thereof, and a voltage generator which supplies the motor with a voltage variable as a function of time in accordance with a predetermined law such that the angular speed of the disc increases during radial movement of the head from the periphery towards the centre of the disc to maintain the relative speed between the disc and the head close to a nominal value.

The invention also encompasses an apparatus for recording and/or reading binary information on a flexible magnetic disk having a magnetizable surface carrying a spiral track, which track lies on an annular region of the disk, and can store the information, the apparatus comprising a rotatable drive member for rotating the disk, motor means for rotating the drive member; a transducing head movable across the region in synchronism with the rotation of the drive member to follow a spiral path with respect to the drive member, a supporting holder for the disk, the holder being movable from an insertion position wherein the disk is insertable in the apparatus, to a working position wherein the disk is engageable by the drive member, start means operative when the holder is in the working position for starting the rotation of the motor, and means for angularly positioning the disk with respect to the drive member to position the transducing head to cause the spiral track to coincide with the spiral path for recording and/or reading the binary information.

BRIEF DESCRIPTION OF THE DRAWINGS

The invention will be described in more detail, by way of example, with reference to the accompanying drawings, in which.

DESCRIPTION OF TWO PREFERRED EMBODIMENTS OF THE INVENTION

Figure 1:
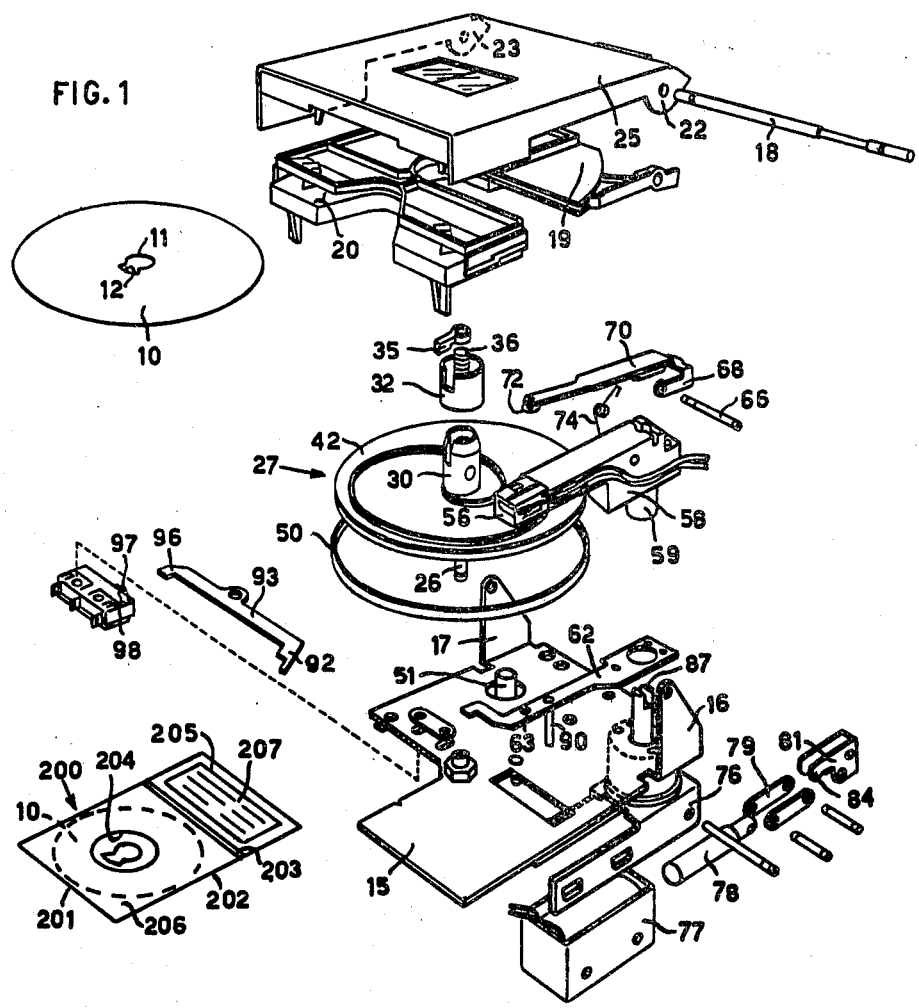
FIG. 1 is an exploded perspective view of a first embodiment of the invention.

The first apparatus embodying the present invention is adapted to write and/or read binary information on a disc 10 (FIG. 1) of flexible type constituted by a thin mylar base support with a diameter of about 64 mm covered with a layer of magnetizable material, for example iron oxide. The disc 10 is provided with a through central hole 11 having a diameter of about 10 mm adjacent which there is formed a radial notch 12 3 mm deep, with a 5 mm width and defined by a circular edge concentric with the hole 11. In accordance with a first embodiment, the apparatus according to the invention comprises a base plate 15 having two lateral lugs 16 and 17 in which a spindle 18 is pivoted. On this spindle 18 is pivoted a holder 19 made, for example, of plastics material and shaped so as to present a slot 20 into which the disc 10 to be written on and/or read can be inserted. A protective cover 25 is also pivoted on the spindle 18 by means of two lugs 22 and 23.

Figure 2:
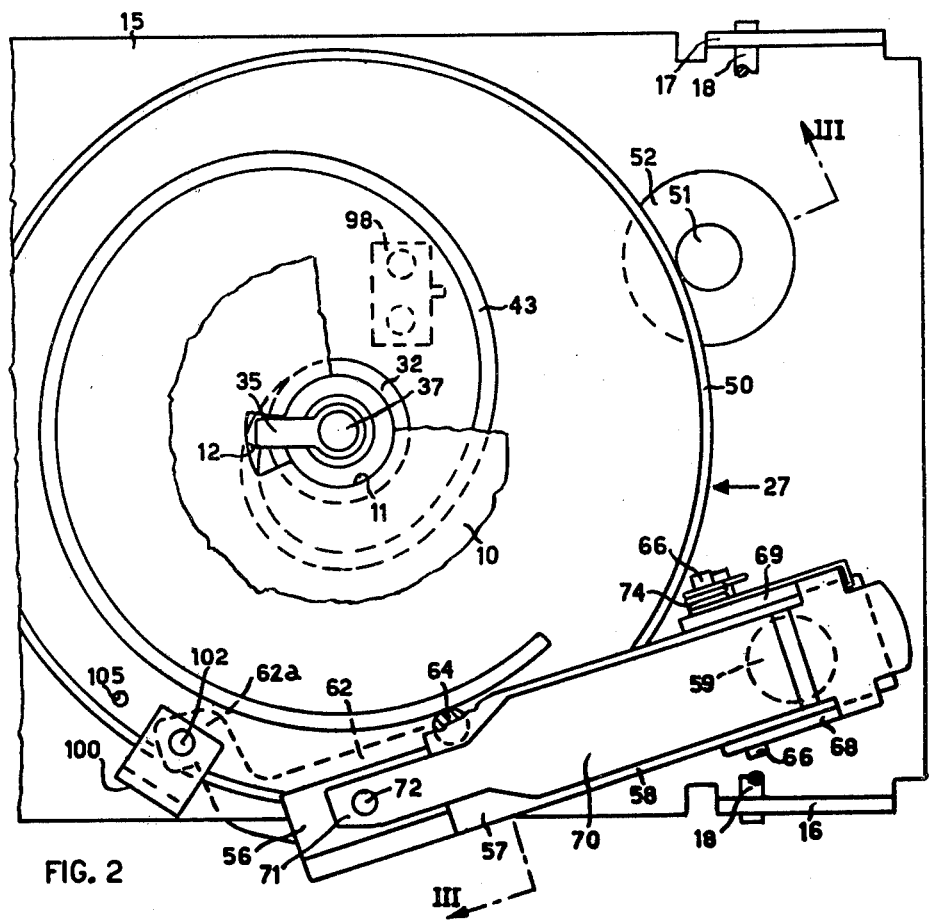
FIG. 2 is a plan view, partly in section, of the apparatus of FIG. 1.
Figure 3:
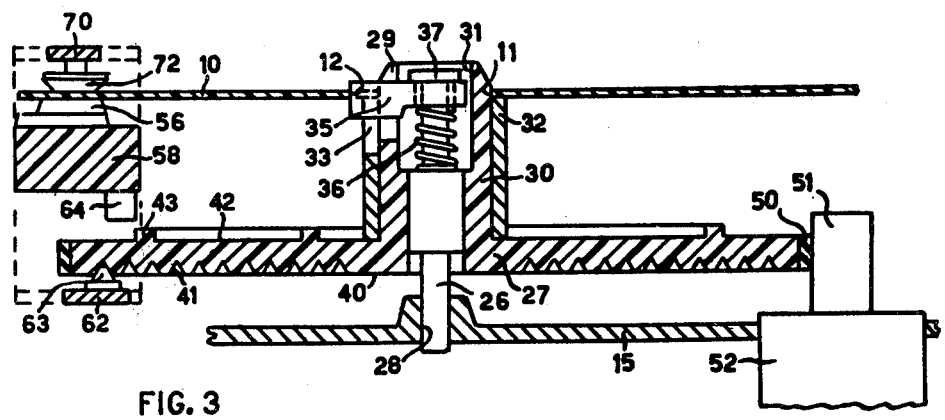
FIG. 3 is a partial section on the line III—III in FIG. 2.

A circular plate 27 with a diameter of about 65 mm is mounted rotatably by means of a central pivot 26 in a hole 28 in the base plate 15 (FIGS. 2 and 3). The plate 27 is shaped so as to have a top hub 30 having an internal cavity 31 and provided with a through vertical slot 29. Coaxially with the hub 30 and fixed thereto there is mounted a bush 32 having a vertical slot 33, this being also a through slot and being aligned with the slot 29 of the hub 30.

A dog 35 about 2 mm wide and adapted to engage with the radial notch 12 of the disc 10 is mounted with play on the top part of the pivot 26 and is guided by the slots 29 and 33. A spring 36 mounted on the pivot 26 keeps the dog 35 biased against a top shoulder 37 of the pivot 26.

On a first surface 40 at the bottom of the plate 27 there is formed, e.g. by moulding, a spiral guide 41 of triangular section having a constant pitch of about 1.2 mm and a developed length of about 2 m. The spiral 41 terminates near the hub 30, with a radius concentric to the same hub 30.

On a second surface 42 opposed to the bottom surface 40 there is formed, also by moulding, but projecting with respect to the surface 42, a second spiral guide 43 of rectangular section which, in contrast to the first guide, has a single turn of opposite hand arriving in the proximity of the periphery of the plate 27 from the hub 30. A rubber ring 50 is fixed to the outer edge of the plate 27. A shaft 51 of an electric motor 52 mounted on the base plate 15 is constantly in contact with the ring 50 to set the plate 27 and the disc 10 in rotation selectively.

Figure 4:
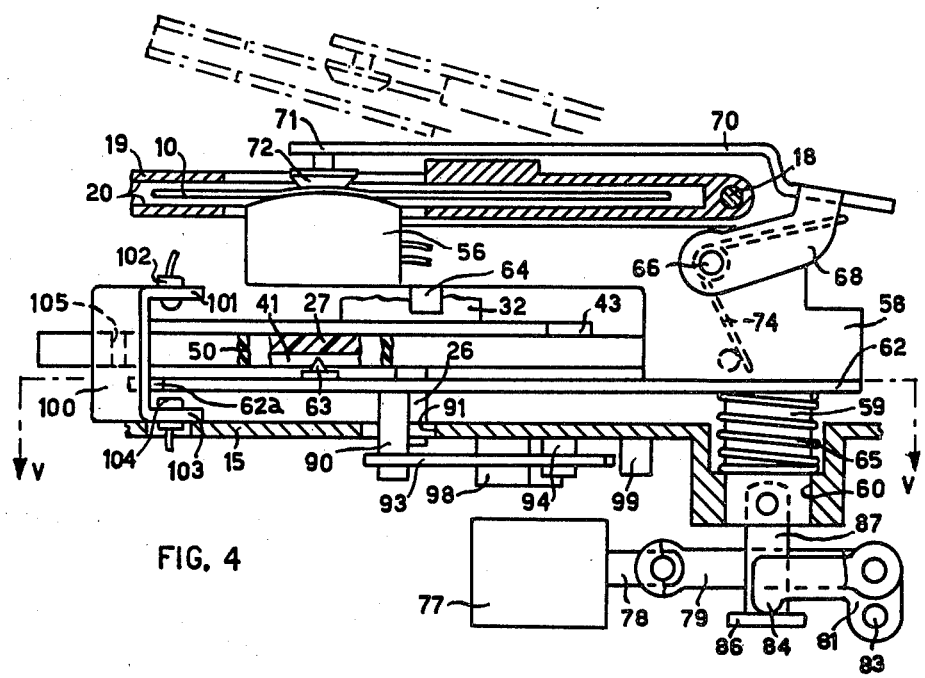
FIG. 4 is a front view, partly in section, of the apparatus of FIG. 1.

A head 56 for magnetic writing and/or reading of information on the disc 10 is mounted at the end 57 of an arm 58 which is pivoted by means of its shaft 59 in a hole 60 in the plate 15 (FIG. 4). The arm 58 bears a plate 62 fixed to the bottom thereof, the plate 62 bearing a metal cusp or point 63 adapted to engage in the groove of the spiral guide 41. Fixed to the bottom of the end 57 is a stud 64 adapted to co-operate with upper spiral guide 43 of the plate 27.

A helical spring 65 disposed coaxially with the shaft 59 normally keeps the arm 58 biased upwardly and the point 63 engaged in the groove of the guide 41.

Pivoted on a pin 66 of the arm 58 by means of its two lugs 68 and 69 is a lever 70 bearing at one end 71 a pressure element or presser 72 opposite the head 56. A spring 74 arranged around the pin 66 normally keeps the presser 72 biased towards the head 56.

Below the plate 15 and fixed to a support 76 there is arranged a solenoid 77 having its armature 78 connected by means of links 79 to a rocking lever 81. This lever 81 is pivoted on a pin 83 and has two projections 84 co-operating with a bottom shoulder 86 of a stem 87 connected to the shaft 59.

Figure 5:
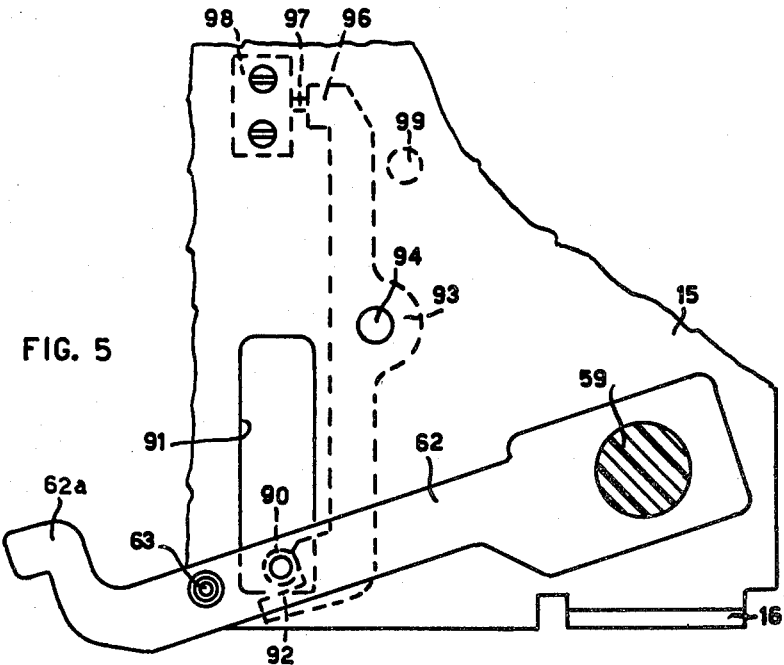
FIG. 5 is a section on the line V—V in FIG. 4.

On the underside of the plate 62 (FIGS. 4 and 5) there is fixed a pin 90 which is housed in a slot 91 in the plate 15 and co-operates with the end 92 of a lever 93. The lever 93 is pivoted on a pin 94 on the bottom of the plate 15 and has its other end 96 in contact with a push button 97 of a microswitch 98 fixed to the plate 15.

A stop pin 99 is fixed to the plate 15 at the end 96 of the lever 93 for limiting the oscillations of the latter.

On the base plate 15 (FIG. 4) there is mounted a U-shaped bracket 100 having an upper arm 101 to which a light emitter 102 is fixed and a lower arm 103 to which a photodetector 104 is fixed. In the plate 27 (FIG. 2), at one end of the lower spiral 41, there is formed a through hole 105 which is brought below the light emitter 102 at each revolution of the plate 27.

The plate 62 has an end 62a adapted to interpose itself between the emitter 102 (FIG. 4) and the photodetector 104.

The motor 52 is of the low inertia type and is adapted to be supplied in such a manner that the angular speed of the plate 27 increases as the writing and/or reading head 56 moves from the periphery towards the centre of the disc 10; this is to cause the relative speed between the head 56 and the disc 10 to be substantially constant. In this way, constant packing of data from the peripheral tracks to the central tracks can be maintained for optimum utilization of the recording support.

For a strictly constant relative speed between the disc and the head, the supply voltage of the motor 52 would have to vary as a function of time in accordance with a rather complex law. It has been observed, however, that by means of the choice of a suitable voltage increasing linearly in time from a predetermined threshold, the variations in speed with respect to a mean value are sufficiently contained.

Figure 6:
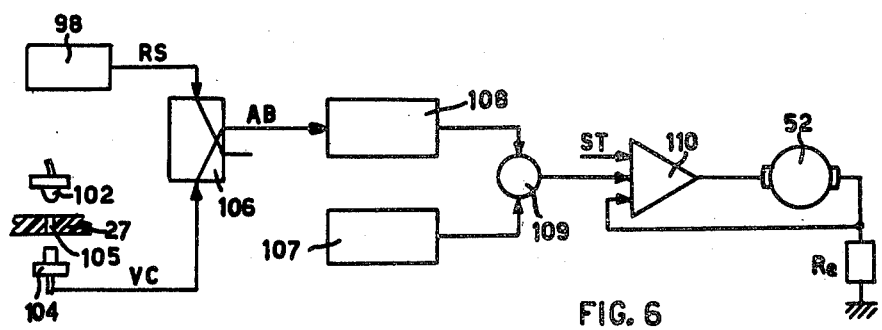
FIG. 6 is a block diagram of a control circuit of the apparatus of FIG. 1.

The supply circuit of the motor 52 (FIG. 6) comprises a constant-voltage generator 107 and a linear ramp generator 108 which have their outputs connected to the inputs of an adder 109. The output of the adder 109 is connected to an input of an amplifier 110 having its output connected to one terminal of the motor 52. The other terminal of the motor 52 is earthed through a resistor $R_e$ having a value equal to the internal resistance of the motor 52 itself. At one end of the resistor $R_e$ there is picked off a positive feedback signal which is sent to a second input of the amplifier 110 to be added algebraically to the signal arriving from the adder 109. At a third input of the amplifier there arrives a start-/stop signal ST for the motor 52 which enables the amplifier.

An enabling signal AB which is provided from a flip-flop 106 is sent to the linear slope generator 108. The inputs of the flip-flop 106 are constituted by a reset signal RS generated by the microswitch 98, which is at 1 level when it is closed by the lever 93, and by the set signal VC generated by the photodetector 104, which is at 1 level when it is activated by the light of the emitter 102.

The apparatus operates in the following manner. In the inoperative position, the plate 27 is stationary and the arm 58 is disposed shifted towards the periphery of the plate (FIGS. 1 and 2) and upwardly (FIG. 3) owing to the action of the spring 65; the metal point 63 is disposed so that it is inserted in the spiral guide 41.

Let it be assumed that it is desired to write and/or read binary information on a magnetic disc 10. To introduce the disc 10 into the apparatus, the holder 19 is raised with respect to the plate 27 (this position being shown in chain-dotted lines in FIG. 4). In this position, the lever 70 bearing the pressure element 72 is raised with respect to the arm 58 through the action of the holder 19.

The disc is introduced into the slot 20 of the holder 19 and then brought into axial alignment with the hub 30 by lowering the holder 19. In this position, the disc 10 is pressed against the writing and/or reading head 56 by the presser 72 under the action of the spring 74. If the notch 12 is above the dog 35, it is immediately engaged by the dog, while in the opposite event the disc 10 pushes the dog 35 downwardly in opposition to the action of the spring 36.

The electric motor 52 is then supplied and sets the plate 27 in rotation. More particularly, the signal ST (FIG. 6) is brought to 1 level in any known manner and enables the amplifier 110. Initially, since the signal VC is at 0 level and the signal RS is at 1 level, the signal AB is at 0 level and the slope generator 108 does not supply any voltage; only the voltage supplied by the generator 107 therefore reaches the amplifier 110 and the motor 52 imparts to the plate 27 a constant angular speed proportional to the voltage of the generator 107. If the dog 35 is not already engaged, because of the play present between the dog 35 and the notch 12 it already engages with the radial notch 12 from the first revolution of the plate 27, the play present between the dog 35 and the notch 12 itself being considerable, and thus causes the disc 10 to rotate. When the plate 27 rotates on its pivot 26, the arm 58 also rotates on its shaft 59, since the metal point 63 is inserted in the spiral guide 41; in this way, the head 56 moves radially with respect to the disc 10 in synchronism with the rotation of the latter and with each angular position of the disc there is associated a precise angular position of the head.

After two revolutions of the plate 27, the pin 90 of the plate 62 disengages itself from the lever 93, the microswitch 98 (FIG. 5) opens through the action of the internal spring of its push button 97 and the signal RS goes to 0 level. Moreover, the end 62a of the plate 62 (FIG. 2) moves away from the photodetector 104 and as soon as the hole 105 passes below the emitter 102 the signal VC changes to 1 level. This signal VC also acts as a start signal for the writing and/or reading of data on the disc 10.

The signal VC, on changing to 1 level, changes over the flip-flop 106. The signal AB, going to 1 level, then enables the generator 108, which supplies a voltage increasing linearly as a function of time to the amplifier 110 through the adder 109. In this way, the angular speed of the plate 27 increases linearly as the head 56 is brought towards the centre of the plate 27 and the relative speed between the head 56 and the disc 10 is maintained substantially constant. More particularly, the data utilizes a zone of the disc in which the ratio between the maximum diameter and the minimum diameter is 2.1:1 and the additional voltage supplied by the slope generator 108 when the head is on the minimum diameter is equal to 1.1 times the voltage of the generator 107. In this way, the relative speed is slightly lower than the nominal value when the head is in the outermost zones and slightly higher when the head is in the central zones of the disc 10.

The packing of the data along the recording track is substantially constant in this way and equal to about 38.5 bits/mm.

When writing and/or reading has taken place, irrespective of the position reached by the head 56 with respect to the disc 10, the electromagnet 77 is energized in known manner and, attracting the armature 78, produces the lowering of the arm 58 through the medium of the links 79 and the lever 81 in opposition to the action of the spring 59. In this way, the head 56 separates itself from the disc 10, the point 63 leaves the guide 41 and the stud 64 co-operates with the upper spiral 43. Under the effect of the rotation of the plate 27, the spiral 43 brings the arms 58 towards the inoperative position, and, when the bottom pin 90 co-operates with the end 92 of the lever 93, the latter, turning anticlockwise, closes the microswitch 98 and the signal RS returns to 1 level, resetting the flip-flop 106. The signal RS also commands the deenergization of the electromagnet 77. The motor 52 is then stopped, bringing the signal ST to 0 level.

The apparatus is thus brought back to the initial position and the disc 10 can be withdrawn from the holder 19.

In accordance with a second embodiment which has less parts than the first embodiment, the apparatus comprises a base plate 215 (FIG. 7) in which there is rotatably mounted, by means of its pivot 226 (FIG. 8), a plate 227 shaped so as to have a top hub 230 and a radial dog 235 adapted to engage with the hole 11 and the notch 12, respectively, of the disc 10.

Figure 7:
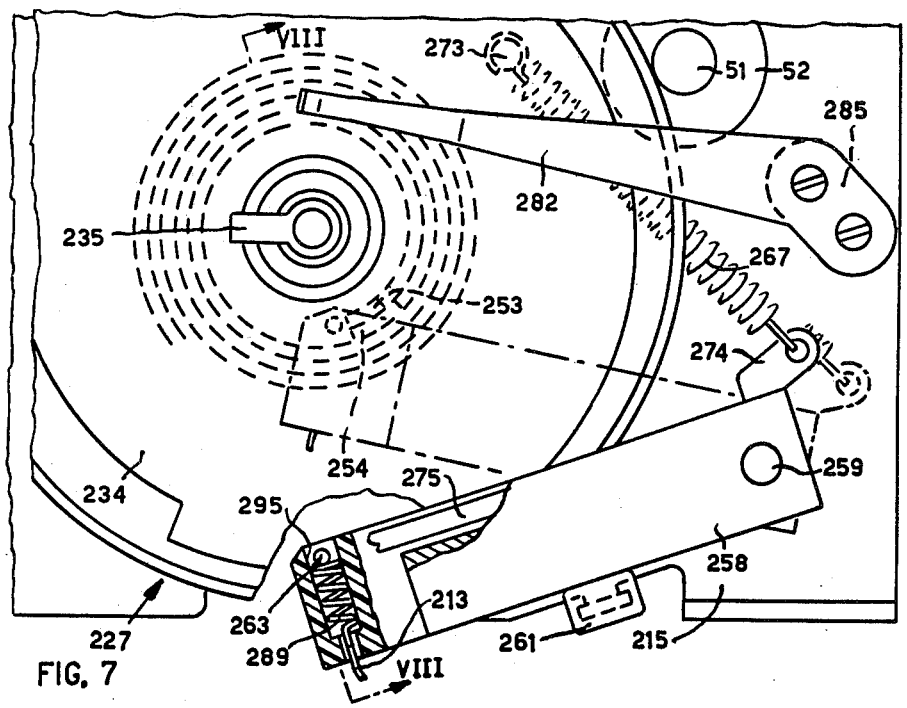
FIG. 7 is a plan view, partly in section, of a second embodiment of the invention.
Figure 8:
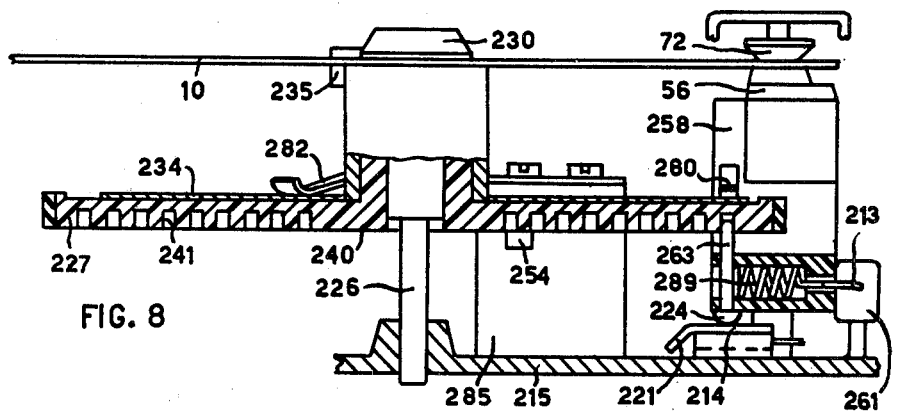
FIG. 8 is a section on the line VIII—VIII in FIG. 7.
Figure 9:
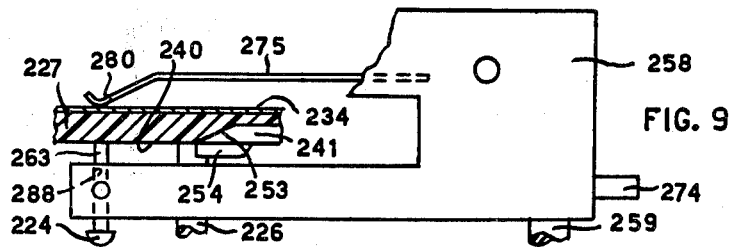
FIG. 9 is a front view, partly in section, of the apparatus of FIG. 7.

On the bottom surface 240 of the plate 227 there is formed by moulding a spiral guide 241 of substantially constant rectangular section having a constant pitch of 2 mm and a developed length of about 1.2 m. On the top surface there is fixed a metal disc 234, the radius of which varies linearly so that the periphery is shaped in the form of a single turn spiral having a pitch of 2 mm (FIG. 7). The guide 241 is shaped in its inner terminal portion so as to define an inclined plane 253 (FIG. 9) connecting the base or far wall of the guide 241 with the surface 240 of the plate 227. At the side of the inclined plane 253 a guide lug 254 projects from the surface 240.

A metal pin 263 is adapted to co-operate with the spiral guide 241 and is mounted slidably in a vertical hole 288 formed at one end of a forked arm 258 mounted rotatably by means of a pivot 259 on the plate 215. The pin 263 is urged against the wall of the hole 288 by a helical spring 289 (FIGS. 7 and 8) housed in a horizontal bore 295 in the arm 258. An electric conductor 213 is fixed to one end of the spring 289. The arm 258 bears a magnetic head 56 and a pressure element 72 at one end, the magnetic head and the pressure element being opposed and normally held against a rubber stop 261 on the plate 215 by a spring 267 stretched between a pin 273 on the plate 215 and a lug 274 of the arm 258.

A first metal leaf spring 275 (FIG. 9) is mounted on the arm 258 and has one end 280 adapted to slide on the surface of the plate 227 and on the metal disc 234. A second metal leaf spring 282 (FIG. 8) is mounted on a block 285 of plastics material fixed to the plate 215 and is always in contact with the metal disc 234. When both the leaf springs 275 and 282 touch the metal disc 234, the electric signal VC of logical 1 level is generated.

A metal plate 214 is fixed to the plate 215 and is provided with an inclined lug 221 adapted to co-operate with the lower part 224 of the pin 263.

In this case, the apparatus operates in the following manner. In the inoperative position, the plate 227 is stationary and the arm 258 is disposed shifted towards the periphery of the plate 227 (FIGS. 7 and 8); the pin 263 bears by means of its end 224 on the plate 214, which keeps it inserted in the spiral guide 241. In this position, since contact between electric conductors 213 and 231 is made through the spring 289, the pin 263 and the plate 214, the electric signal RS of 1 level is generated.

The disc 10 to be written on and/or read is then positioned with respect to the hub 230 and the head 56 and the plate 227 is caused to rotate in a similar manner to that previously described.

The pin 263 being inserted in the spiral guide 241, there corresponds to the rotation of the plate 227 a rotation of the arm 258 on its pivot 259 in opposition to the action of the spring 267.

After two revolutions of the plate 227, the leaf spring 275 touches the metal disc 234; contact is established between the leaf springs 275 and 282 and the signal VC, which also serves as a synchronizing signal for the commencement of writing and/or reading, is brought to 1 level. In this position, the pin 263 is no longer in contact with the plate 214 and the signal RS changes to 0 level.

When the arm 258 arrives in the proximity of the hub 230, the pin 263, co-operating with the inclined plane 253 and guided by the lug 254, is urged downwardly and emerges from the guide 241 and the arm 258 is drawn towards the rubber stop 261 by the spring 267. Returning to the inoperative position, the lower end 224 of the pin 263 co-operates with the inclined lug 221 and the pin 263 is again urged towards the guide 241. Contact is also established between the conductors 213 and 231 and the end-of-cycle signal RS changes to 1 level again.

To prevent the disc 10 being damaged when it is not inserted in the apparatus, it is normally contained in an envelope 200 (FIG. 1) of thin card which has a side 201 a little larger than the diameter of the disc 10 and a larger side 202 substantially larger than the diameter.

The envelope 200 comprises an upper part 205 of substantially rectangular shape to which is fixed a label 207 indicating the contents of the disc and a lower part 206 of substantially square shape into which the disc 10 is inserted from an intermediate slit 203.

The lower part 206 is provided with a circular opening 204 for viewing the disc contained therein. In this way there can be written on the label 207, without any special expedients being employed, all the details relating to the information recorded on the disc, without damaging the magnetic support, and the envelope can moreover be handled easily to be filed or enclosed with a document if necessary.

What we claim is:

1. An apparatus for recording and/or reading binary information on a flexible magnetic disk having a magnetizable surface carrying a spiral track, which tracks lies on an annular region of said disk, and can store said information, said apparatus comprising:
   a rotatable drive member for rotating said disk;
   motor means for rotating said drive member;
   a transducing head movable across said region in synchronism with the rotation of said drive member to follow a spiral path with respect to said drive member;
   a supporting holder for said disk, which holder is movable from an insertion position wherein said disk is insertable in said apparatus, to a working position wherein said disk is engageable by said drive member;
   start means operative when said holder is in said working position for starting the rotation of said motor; and
   means for angularly positioning said disk with respect to said drive member to position said transducing head to cause said spiral track to coincide with said spiral path for recording and/or reading said binary information.

2. An apparatus according to claim 1, wherein said disk has a central hole and a radial notch, and wherein said drive member comprises a hub and said angular positioning means comprises an engaging dog cooperating with said notch.

3. An apparatus according to claim 2 wherein said engaging dog is axially shiftable with respect to said hub and projects radially outward from said hub, and an urging member causes said engaging dog to engage on the fly the notch of said positioned disk during rotation of said hub.

4. An apparatus according to claim 1, wherein a sensor is provided for sensing the passage of said transducing head through a predetermined position with respect to said annular region for beginning the recording and/or reading of said binary information on said disk.

5. An apparatus according to claim 4, wherein said head is normally outside of said annular region and said sensor senses the passage of the transducing head on said annular region.

6. An apparatus according to claim 4, wherein said spiral track begins near the periphery of said disk and said sensor senses the passage of said transducer head through the beginning of said spiral track.

7. An apparatus according to claim 2, wherein said supporting holder in said working position causes said disk to be pressed against said transducing head in a region of said disk outside of said annular region.

* * * * *